United States Patent
Michaelis, IV

(10) Patent No.: US 9,350,151 B2
(45) Date of Patent: May 24, 2016

(54) ELECTRICAL OUTLET WALL PLATE CONFIGURED FOR CABLE RETENTION

(71) Applicant: Michaelis Industries Ltd. Co., Houston, TX (US)

(72) Inventor: Max G. Michaelis, IV, Houston, TX (US)

(73) Assignee: MICHAELIS INDUSTRIES LTD. CO., Houston, TX (US)

( * ) Notice: Subject to any disclaimer, the term of this patent is extended or adjusted under 35 U.S.C. 154(b) by 30 days.

(21) Appl. No.: 14/289,724

(22) Filed: May 29, 2014

(65) Prior Publication Data
US 2015/0083454 A1    Mar. 26, 2015

Related U.S. Application Data

(60) Provisional application No. 61/960,751, filed on Sep. 26, 2013.

(51) Int. Cl.
  *H02G 3/14* (2006.01)
  *H02G 3/08* (2006.01)
  *B29K 101/12* (2006.01)
  *B29L 31/36* (2006.01)

(52) U.S. Cl.
  CPC ............... *H02G 3/14* (2013.01); *H02G 3/083* (2013.01); *B29K 2101/12* (2013.01); *B29L 2031/36* (2013.01)

(58) Field of Classification Search
  CPC ................................ H02G 3/14; H02G 3/083
  USPC ....................................................... 174/66, 67
  See application file for complete search history.

(56) References Cited

U.S. PATENT DOCUMENTS

| | | | |
|---|---|---|---|
| 2,438,143 A | 9/1945 | Brown | |
| 3,257,497 A | 6/1966 | Chase | |
| 3,331,915 A * | 7/1967 | Lucci | 174/66 |
| 3,930,116 A | 12/1975 | Richards | |
| D275,175 S | 8/1984 | Rolli, Jr. | |
| 4,768,974 A | 9/1988 | Cowan et al. | |
| 4,921,444 A * | 5/1990 | Cama | 439/528 |
| D325,564 S | 4/1992 | Lemke | |
| 5,547,390 A | 8/1996 | Laherty | |
| 7,255,588 B2 | 8/2007 | Wilder | |
| 7,470,141 B2 | 12/2008 | Yoest | |
| 8,070,111 B1 | 12/2011 | Zeller | |
| 8,152,543 B1 | 4/2012 | Schutte | |
| 2012/0225578 A1 | 9/2012 | Adams | |

* cited by examiner

*Primary Examiner* — Dhirubhai R Patel
(74) *Attorney, Agent, or Firm* — Edward J. Lenart; John C. Bennett; Kennedy Lenart Spraggins LLP

(57) ABSTRACT

An electrical outlet wall plate is configured for cable retention and the wall plate includes: a front and back side; one or more openings having a shape configured to receive an outlet socket protrusion; one or more holes having a shape configured to receive a fastener; and one or more hybrid cleats extruding from the front side, each hybrid cleat including two horns extending from the front side in opposite directions at an angle with respect to the front side so as to define a tapered space between the horn and the front side, the tapered space being the widest at the end of the horn and tapering to the narrowest where the horn contacts the front side, the tapered space configured to receive an electrical cable, the electrical cable being jammed in the tapered space between the horn and the front side of the wall plate.

18 Claims, 6 Drawing Sheets

ELECTRICAL OUTLET WALL PLATE CONFIGURED FOR CABLE RETENTION

CROSS REFERENCE TO RELATED APPLICATION

This application claims the benefit of U.S. Provisional Application No. 61/960,751, filed Sep. 26, 2013.

BACKGROUND OF THE INVENTION

1. Field of the Invention

The field of the invention is electrical outlet wall plates configured for cable retention, molds for manufacturing such wall plates and methods for manufacturing such wall plates.

2. Description of Related Art

Inadvertent unplugging of power cables for electrical sockets is a problem that affects every electrical device which requires a continuous source of power from an outlet, particularly when the electrical device must be moved frequently, as is the case with vacuum cleaners, floor polishers, and power tools. Additionally, inadvertent unplugging is a constant threat to critical devices such as medical equipment and computers performing essential functions.

There are many existing designs for electrical outlet wallplates. Most are decorative, but several variations have been designed to prevent inadvertent unplugging and aid in excess cable storage. Existing electrical outlet plate designs which attempt to prevent inadvertent unplugging involve clips, straps, brackets, and loops, some of which are separate attachments, rather than integral pieces of the outlet wall-plate, which hold the cable in place. Many of the designs also require two-handed operation to secure an electrical cable and release the cable.

Related art also contains separate devices which can be installed on the walls around electrical outlets to retain cable. There are several drawbacks of these types of devices. For example, some of these devices must be anchored to a suitable wall using a means of attachment other than the screw or screws which hold an electrical outlet wall-plate in place, the devices are structurally weak unless anchored to a stud, some of the devices are visually less appealing, and some must be positioned farther away from the electrical outlet, which requires the use of more of the length of the cable to secure the cable.

Electrical outlet wall-plate designs which aid in excess cable storage serve an entirely different function from reducing inadvertent unplugging of the cable. Some of these wall-plates have projections that are not capable of preventing an inadvertent unplugging unless a user wrapped a substantial amount of electrical cable around the projections.

SUMMARY

Electrical outlet wall plates configured for cable retention, injection molds utilized during manufacturing of such wall plates, and methods of manufacturing such wall plates are disclosed in this specification. The wall plates include: a front and back side; one or more openings having a shape configured to receive an electrical outlet socket protrusion; one or more holes having a shape configured to receive a fastener, the fastener configured to fasten the wall plate to an electrical outlet; and one or more hybrid cleats extruding from the front side of the wall plate, each hybrid cleat including two horns extending from the front side of the wall plate in opposite directions at an angle with respect to the front side of the wall plate so as to define a tapered space between the horn and the front side of the wall plate, the tapered space being the widest at the end of the horn and tapering to the narrowest where the horn contacts the front side of the wall plate, the tapered space configured to receive an electrical cable, the electrical cable being jammed in the tapered space between the horn and the front side of the wall plate.

Injection molds utilized to manufacture such wall plates include a cavity configured to receive liquid, injected material, where the cavity has a shape defined by an electrical outlet wall plate configured for cable retention.

Methods of manufacturing such wall plates include: receiving source material in a solid state; heating the source material into a liquid state; and injecting the liquid source material into a mold cavity, the mold cavity having a shape defined by an electrical outlet wall plate configured for cable retention.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
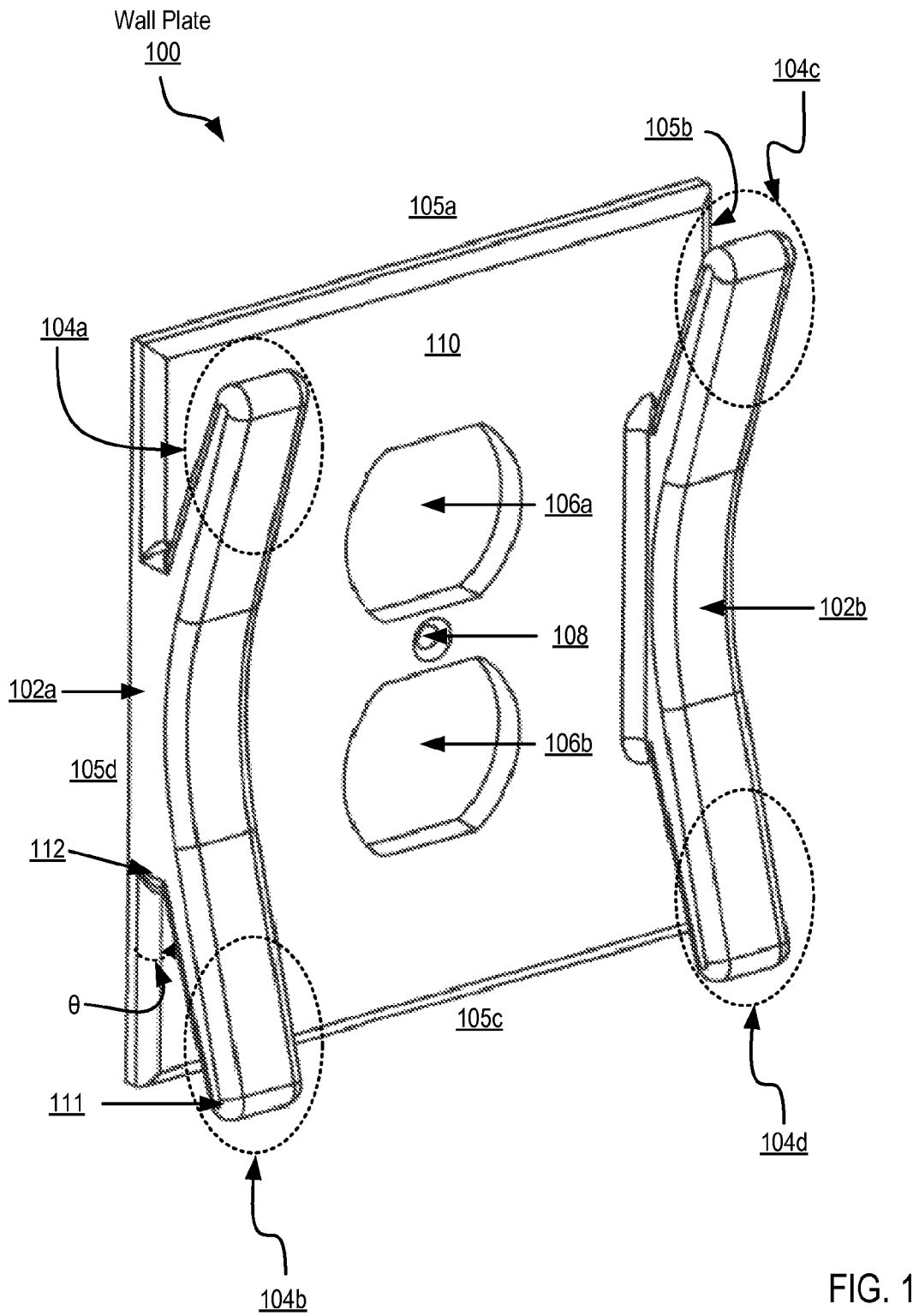
FIG. 1 sets forth a perspective view of an example electrical outlet wall plate configured for cable retention according to embodiments of the present invention.

Exemplary electrical outlet wall plates configure for cable retention, injection molds utilized for the manufacture of such wall plates and methods for manufacturing such wall plates in accordance with embodiments of the present invention are described with reference to the accompanying drawings, beginning with FIG. 1. FIG. 1 sets forth a perspective view of an example electrical outlet wall plate configured for cable retention according to embodiments of the present invention.

The example wall plate (100) of FIG. 1 is configured for installation over an electrical outlet. Such electrical outlets may be configured according to a variety of standards. A North American socket, for example, may be configured according to the NEMA (National Electrical Manufacturers Association) 1-15 or 5-15 standard. Further, some sockets may be configured with GFCI (ground fault circuit interrupter) protection. Readers of skill in the art will immediately recognize that, although the example wall plate (100) is depicted as a wall plate for use with NEMA standard electrical outlets, wall plates configured for cable retention in accordance with embodiments of the present invention may be manufactured to for use with any type of standard electrical outlets.

The example wall plate (100) of FIG. 1 includes a front side (110) and a back side (not shown in this Figure). The wall plate (100) also includes one or more openings (106a, 106b). Each of the openings (106a, 106b) has a shape configured to receive an electrical outlet socket protrusion. The term 'electrical outlet socket protrusion' as used in this specification refers to the portion of an electrical outlet into which the prongs of a male electrical cable are inserted. As mentioned above, in at least some embodiments, at least one of the openings (106sa, 106b) may have a shape configured to receive a GFCI socket protrusion.

The example wall plate (100) of FIG. 1 also includes one or more holes (108) having a shape configured to receive a fastener, where the fastener is configured to fasten the wall plate to an electrical outlet. Examples of such fasteners may include a screw, a nail, a bolt, or the like. The example wall plate (100) of FIG. 1 includes only a single hole for purposes of clarity and illustration only, not limitation. Readers of skill in the art will recognize that wall plates (100) configured for cable retention in accordance with embodiments of the present invention may include any number of fastener holes. In embodiments in which such a wall plate is configured as a decorative wall plates for NEMA standard outlets, for example, two or more fastener holes may be included in the wall plate (100).

The example wall plate (100) of FIG. 1 also includes one or more hybrid cleats (102a, 102b). A 'cleat,' as term is used in this specification is a portion of a wall plate configured to secure a cable. Cleats are utilized in the nautical environment to secure ropes. Such nautical cleats are implemented in a variety of ways, including:
  a horn cleat featuring two "horns" extending parallel to the deck or the axis of the spar, attached to a flat surface or a spar, and resembling an anvil;
  a cam cleat in which one or two spring-loaded cams pinch a rope, allowing the rope to be adjusted easily, and quickly released when under load;
  a jam cleat in which the line is pinched in a v-shaped slot; and
  a clam cleat in which the rope is held between two fluted stationary pieces, where such a cleat vaguely resembles two halves of a clam shell held back to back.

Each cleat (102a, 102b) in the example of FIG. 1 is described as a 'hybrid' cleat in that the cleat is not any one of the traditional nautical cleats in shape, functionality, or operation. Instead, each hybrid cleat is an adaptation, combination, and improvement of a horn cleat and jam cleat. As will be described below in further detail, the traditional horn cleat has horns parallel to the surface upon which the cleat is affixed while the hybrid cleat does not. Also in contrast to the hybrid cleat, the clam cleat typically includes only a single protrusion rather than multiple horns like the hybrid cleat.

Each cleat (102a, 102b) in the example of FIG. 1 extrudes from the front side (110) of the wall plate (100). Each hybrid cleat two horns ((104a, 104b, 104c, 104d) extending from the front side of the wall plate in opposite directions. In the example of FIG. 1, each hybrid cleat is symmetrical in that one horn (104a, 104c) extrudes toward a top edge (105a) of the wall plate while another horn (104b, 104d) of exact dimension extrudes towards a bottom edge (105c). Further, each horn extrudes at an angle (theta) with respect to the front side (110) of the wall plate. Theta may be between 0 and 90 degrees so as to define a tapered space between the underside of the horn and the front side (110) of the wall plate (100). The tapered space is the widest at the end (111) of the horn (104a, 104b, 104c, 104d) and the space tapers to the narrowest where the horn (104a, 104b, 104c, 104d) contacts the front side (110) of the wall plate (100). The tapered space is configured to receive and jam the electrical cable in the tapered space between the horn (104a, 104b, 104c, 104d) and the front side (110) of the wall plate (100). The space beneath the underside of the horns is angled, tapering from wide to narrow, to allow different widths of electrical cables to be secured by jamming them as far as possible towards the narrow end of the space. The compression created by jamming aids the cleat in securing the cord in place. In this way, a user may secure an electrical cable quickly and with one hand to prevent the electrical cable from inadvertently coming unplugged.

The example wall plate (100) of FIG. 1 also includes four edges defining a rectangular perimeter of the wall plate (100). The four edges include a top edge (105a), a bottom edge (105c), a left edge (105d), and a right edge (105b). The example horns (104a, 104b, 104c, 104d) of the hybrid cleats (102a, 102b) in the example of FIG. 1 are positioned to the left and right of the openings (106a, 106b) and are parallel to the left and right edges (105b, 105c). Readers of skill in the art will recognize, however, that in other embodiments, the horns of a cleat may be parallel to the top edge (105a), and the cleat may be positioned above the openings (106a, 106b), and nearer to the top edge than the bottom edge. In some embodiments the horns of a cleat may be parallel to the bottom edge (105c) and the cleat may be positioned below the openings (106a, 106b), and nearer to the bottom edge than the top edge. That is, hybrid cleats in wall plates configured for cable retention in accordance with embodiments of the present invention may be positioned along and parallel to any edge of the wall plate.

Further, although the wall plate (100) in the example of FIG. 1 is configured for a single gangbox, wall plates (100) may be configured with a multiple-gangbox width. In such embodiments, the hybrid cleats may also be positioned between sets of openings parallel to a left and right edge, such that one of the horns extrudes towards the top edge and the other horn extrudes toward the bottom edge. Further, in such embodiments, more than one hybrid cleat may be positioned along an in parallel to one single edge. Consider, for example, a wall plate configured with a double gangbox width, and two sets of two socket openings; one for each gangbox. In such an embodiment, two hybrid cleats may be positioned along and in parallel to the top edge of the wall plate. One of the two cleats along the top edge may be approximately centered on a first set of the socket openings while the second cleat along the top edge may be centered along the second set of socket openings. Likewise, two cleats may be positioned along and in parallel to the bottom edge of the wall plate, with each centered on a separate set of socket openings.

The hybrid cleats (102a, 102b) in the example of FIG. 1 are 'integral' cleats in that the cleats and wall plate are formed of a single piece. In some embodiments, the wall plate (100) (with the hybrid cleats) is comprised of a single piece of injection-molded plastic. Readers of skill in the art will recognize, however, that other materials may be useful in manufacturing such a wall plate including, for example, aluminum, wood, brass, or steel, and others.

Figure 2:
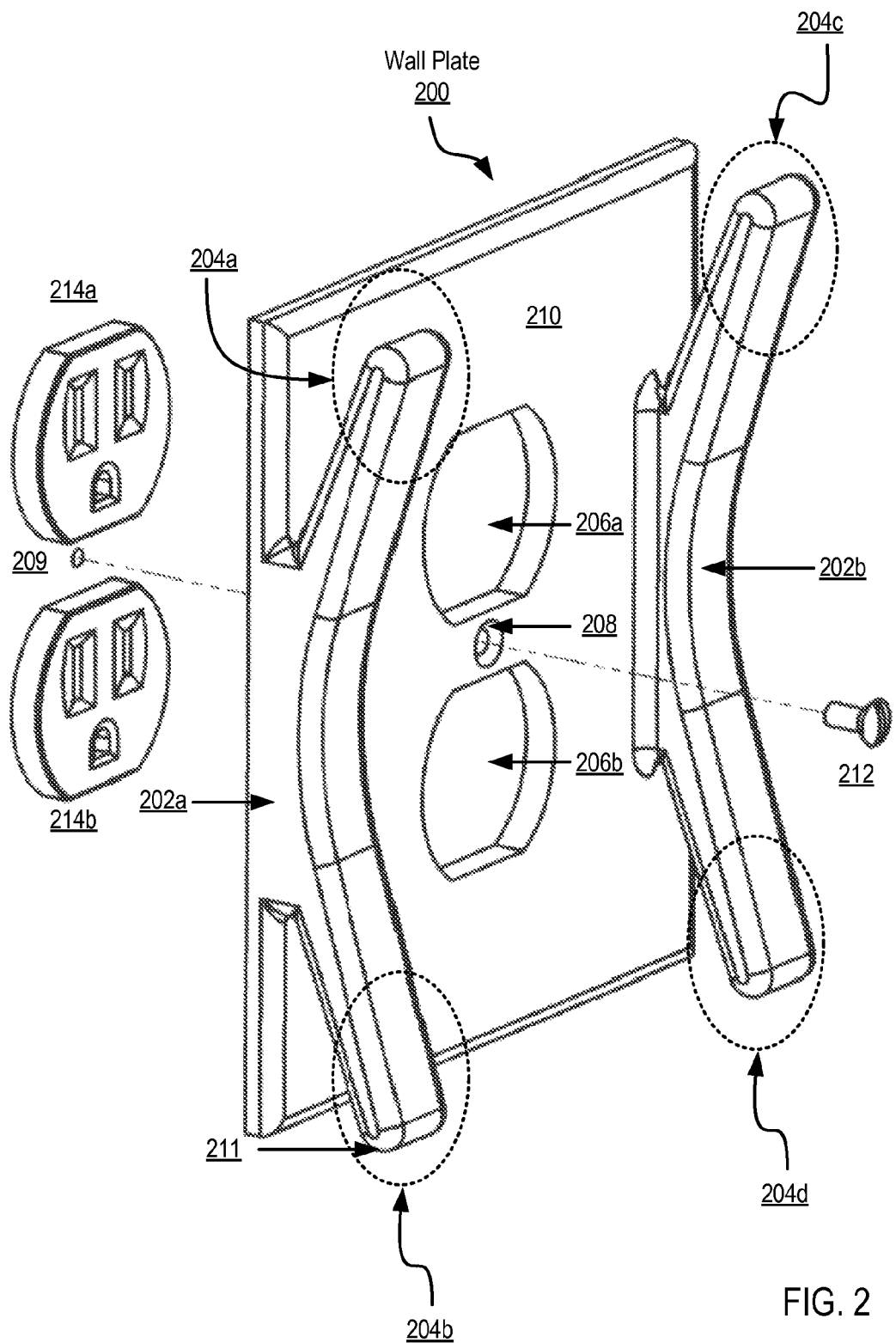
FIG. 2 depicts another perspective view of an example electrical wall plate configured for cable retention in accordance with embodiments of the present invention prior to installation of the wall plate.

For further explanation, FIG. 2 depicts another perspective view of an example electrical wall plate configured for cable retention in accordance with embodiments of the present invention prior to installation. The example wall plate (200) of FIG. 2 is similar to the wall plate (100) of FIG. 1 in that the example wall plate (200) of FIG. 2 includes: a front (210) and back side; one or more openings (206a, 206) having a shape configured to receive an electrical outlet socket protrusion (214a, 214b); one or more holes (208) having a shape configured to receive a fastener (212); and one or more hybrid cleats (202a, 202b) extruding from the front side (210) of the wall plate (200), with each cleat (202a, 202b) including: two horns (204a, 204b, 204c, 204d) extending from the front side of the wall plate in opposite directions at an angle with respect to the front side of the wall plate so as to define a tapered space between the horn and the front side of the wall plate, the tapered space being the widest at the end (211) of the horn and tapering to the narrowest where the horn contacts the front side of the wall plate, the tapered space configured to receive an electrical cable, the electrical cable being jammed in the tapered space between the horn and the front side of the wall plate.

The example of FIG. 2 also depicts two electrical outlet socket protrusions (214a, 214b). When the wall plate (200) is installed, the socket protrusions (214a, 214b) will protrude into the openings (206a, 206b). The example of FIG. 2 also depicts an example fastener (212) in the form of a screw. When the wall plate (200) is installed, the screw will be inserted through the hole (208) and into the hole (209). The screw will fasten the wall plate to the socket through the holes (208, 209).

Figure 3:
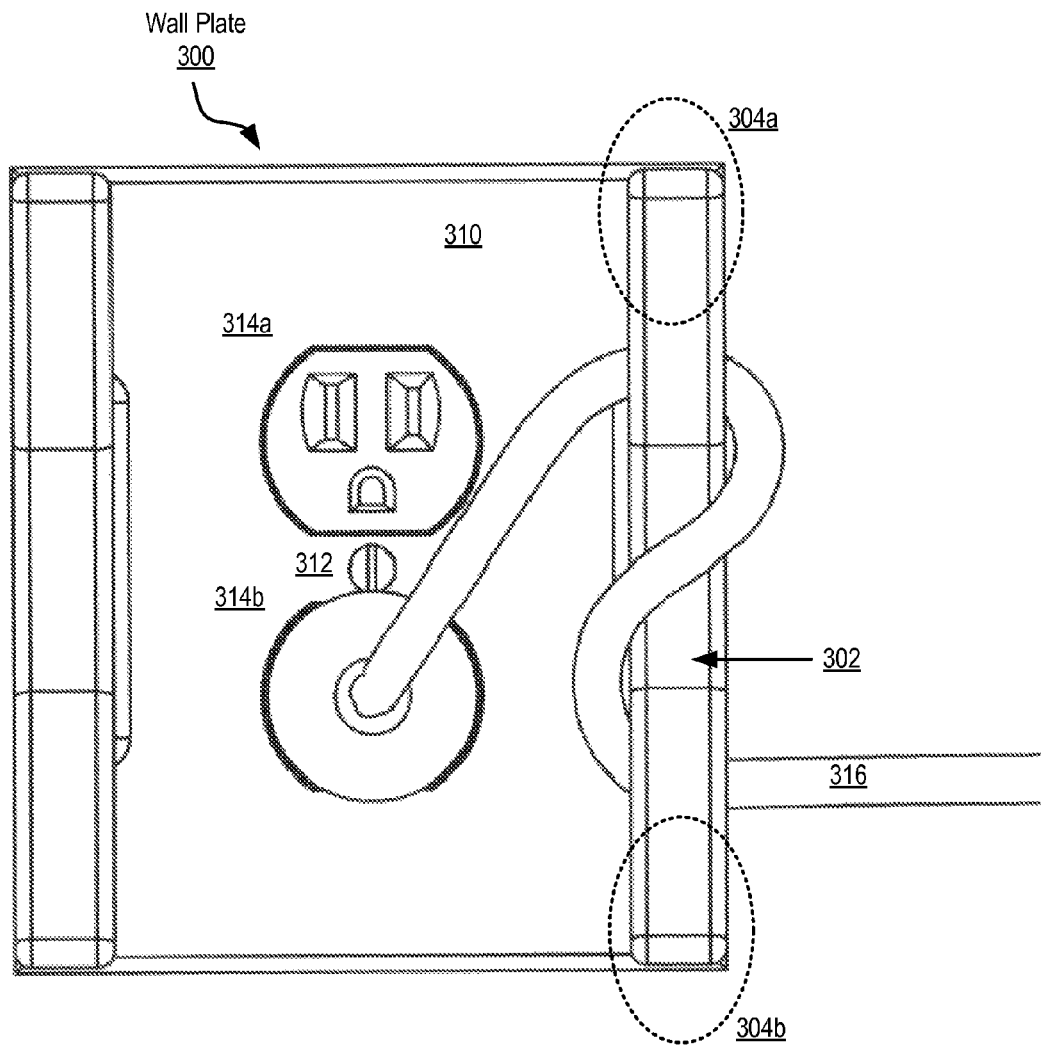
FIG. 3 depicts another perspective view of an example wall plate configured for cable retention in accordance with embodiments of the present invention after installation and in use to secure a cable from inadvertent unplugging.

For further explanation, FIG. 3 depicts another perspective view of an example wall plate configured for cable retention in accordance with embodiments of the present invention after installation and in use to secure a cable from inadvertent unplugging. The example wall plate (300) of FIG. 3 is similar to the example wall plate of FIG. 1 in that the example wall plate of FIG. 3 includes: a front (310) and back side; one or more openings having a shape configured to receive an electrical outlet socket protrusion (314a, 314b); one or more holes having a shape configured to receive a fastener (312); and one or more hybrid cleats (302) extruding from the front side (310) of the wall plate (300), with each cleat (302) including: two horns (304a, 304b) extending from the front side of the wall plate in opposite directions at an angle with respect to the front side of the wall plate so as to define a tapered space between the horn and the front side of the wall plate, the tapered space being the widest at the end of the horn and tapering to the narrowest where the horn contacts the front side of the wall plate, the tapered space configured to receive an electrical cable, the electrical cable being jammed in the tapered space between the horn and the front side of the wall plate.

The example wall plate (300) in the example of FIG. 3 has been installed on a socket. The socket includes two electrical socket protrusions (314a, 314b), both of which are protruding into the openings of the wall plate. The wall plate (300) is fastened to the socket by a flat head screw (312) which is inserted through the hole of the wall plate and into a hole of the socket. In addition, a power cable (316) is inserted or 'plugged in' to the socket in the socket protrusion nearest the bottom edge of the wall plate. The cable is secured from inadvertent unplugging by wrapping the cable through, from left to right) the tapered space between the top horn (304a) of the hybrid cleat (302) and the front side (310) of the wall plate then again the through, from left to right, the tapered space between the bottom horn (304b) and the front side (310) of the wall plate. At each wrapping (in the tapered space of the top and bottom horn), the cable can be pulled by a user so as to jam the cable in the narrowest portion of the tapered space possible due to the diameter of the cable (316). In this way, a user may secure an electrical cable from inadvertent unplugging with single-handed operation. Further removal of the cable (316) from the wall plate when unplugging is desired, may also be performed with a single-handed operation by releasing the cable from the jam in the tapered spaces beneath the horns (304a, 304b).

Figure 4:
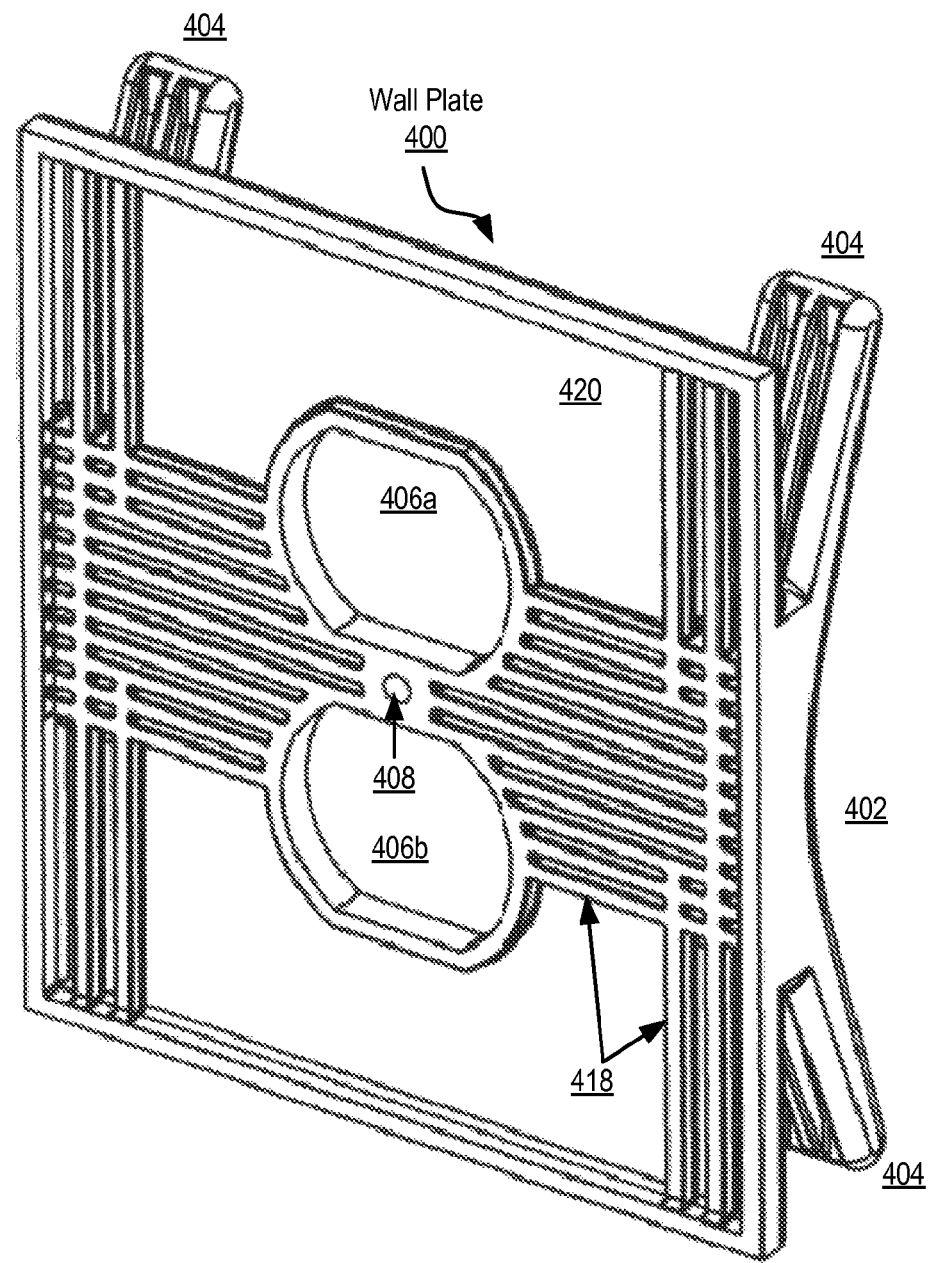
FIG. 4 sets forth another perspective view of an example wall plate configured for cable retention according to embodiments of the present invention.

For further explanation, FIG. 4 sets forth another perspective view of an example wall plate configured for cable retention according to embodiments of the present invention. The example wall plate (400) of FIG. 4 is similar to the example wall plate of FIG. 1 in that the example wall plate of FIG. 4 includes: a front and back (420) side; one or more openings (406a, 406b) having a shape configured to receive an electrical outlet socket protrusion; one or more holes (408) having a shape configured to receive a fastener; and one or more hybrid cleats (402) extruding from the front side of the wall plate (400), with each cleat (402) including: two horns (404) extending from the front side of the wall plate in opposite directions at an angle with respect to the front side of the wall plate so as to define a tapered space between the horn and the front side of the wall plate, the tapered space being the widest at the end of the horn and tapering to the narrowest where the horn contacts the front side of the wall plate, the tapered space configured to receive an electrical cable, the electrical cable being jammed in the tapered space between the horn and the front side of the wall plate.

The back side (420) of the wall plate of FIG. 4 also includes one or more structural ridges (418) configured to increase strength and rigidity of the wall plate. Due to the strain placed on the wall plate by forces exerted by a cable that is secured by one of the cleats, the wall plate may at times be bent at various angles. To ensure that the wall plate does not break or otherwise become malformed, the structural ridges (418) increase rigidity and strength of the wall plate. Although the structural ridges are depicted in the example of FIG. 4 in a particular formation, readers of skill in the art will recognize that such ridges may be formed in a variety of formations to increase rigidity and strength of the wall plate. Each such formation is well within the scope of embodiments of the present invention.

Figure 5:
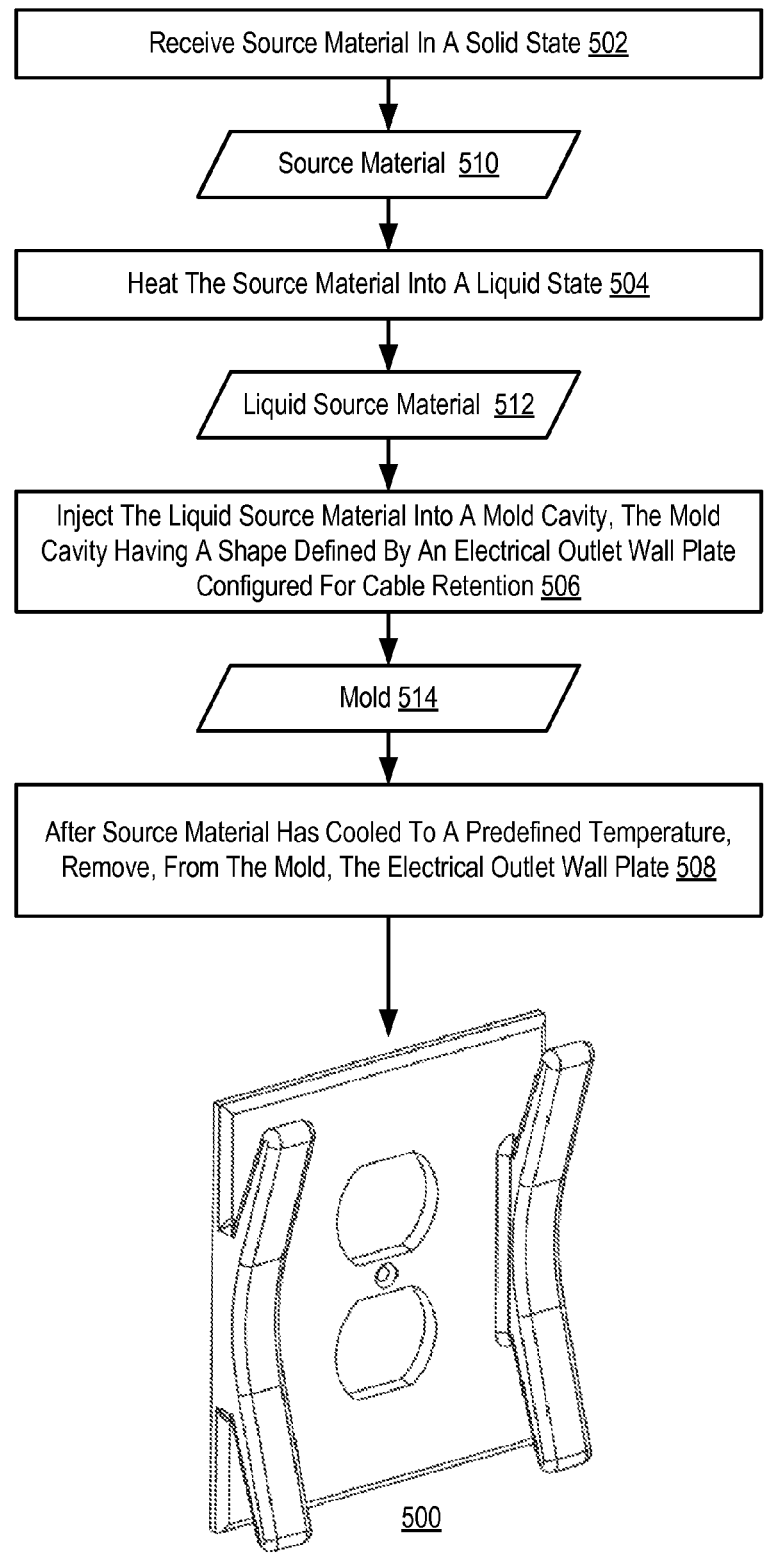
FIG. 5 sets forth a flow chart depicting an example method of manufacturing a wall plate configured for cable retention in accordance with embodiments of the present invention.

For further explanation, FIG. 5 sets forth a flow chart depicting an example method of manufacturing a wall plate configured for cable retention in accordance with embodiments of the present invention. The example method of FIG. 5 includes receiving (502) source material (510) in a solid state. Such source material may include metal, glass, elastomers, thermoplastic and thermosetting polymers, among others. Receiving (502) such source material may be carried out in various ways including, for example, by receiving plastic granules in a hopper.

The method of FIG. 5 also includes heating (504) the source material (510) into a liquid state. Heating (504) the source material into a liquid state may be carried out in a variety of ways including, for example, by forcing the granules through a barrel by a reciprocating screw, where a heater increases the temperature of the source material while the source material travels down the barrel.

The method of FIG. 5 also includes injecting (506) the liquid source material (512) into a mold (514) cavity. Injecting (505) the liquid material into a mold cavity may be carried out in various ways including, for example, by forcing the heated, liquid material through a nozzle at the end of the barrel by the reciprocating screw. In the example of FIG. 5, the mold cavity has a shape defined by an electrical outlet wall plate configured for cable retention similar to those described above. That is, the mold is configured with a cavity that forms the dimension of a wall plate that includes: a front and back side; one or more openings having a shape configured to receive an electrical outlet socket protrusion; one or more holes having a shape configured to receive a fastener, the fastener configured to fasten the wall plate to an electrical outlet; and one or more hybrid cleats extruding from the front side of the wall plate, each hybrid cleat including two horns extending from the front side of the wall plate in opposite directions at an angle with respect to the front side of the wall plate so as to define a tapered space between the horn and the front side of the wall plate, the tapered space being the widest at the end of the horn and tapering to the narrowest where the horn contacts the front side of the wall plate, the tapered space configured to receive an electrical cable, the electrical cable being jammed in the tapered space between the horn and the front side of the wall plate.

The method of FIG. 5 also include removing (508), from the mold after the liquid source material is cooled to a predefined temperature, the electrical outlet wall plate (500). Removing the electrical outlet wall plate from the mold may be carried out by removing a top portion of the mold from a bottom portion. Further, once removed, the wall plate may be clamped in a position to ensure that during future cooling to a second predefined temperature (room temperature in some embodiments) the deformation of the wall plate is reduced. In this way, the wall plate may be configured to be as flush as possible with a wall on which the wall plate will be installed.

Figure 6:
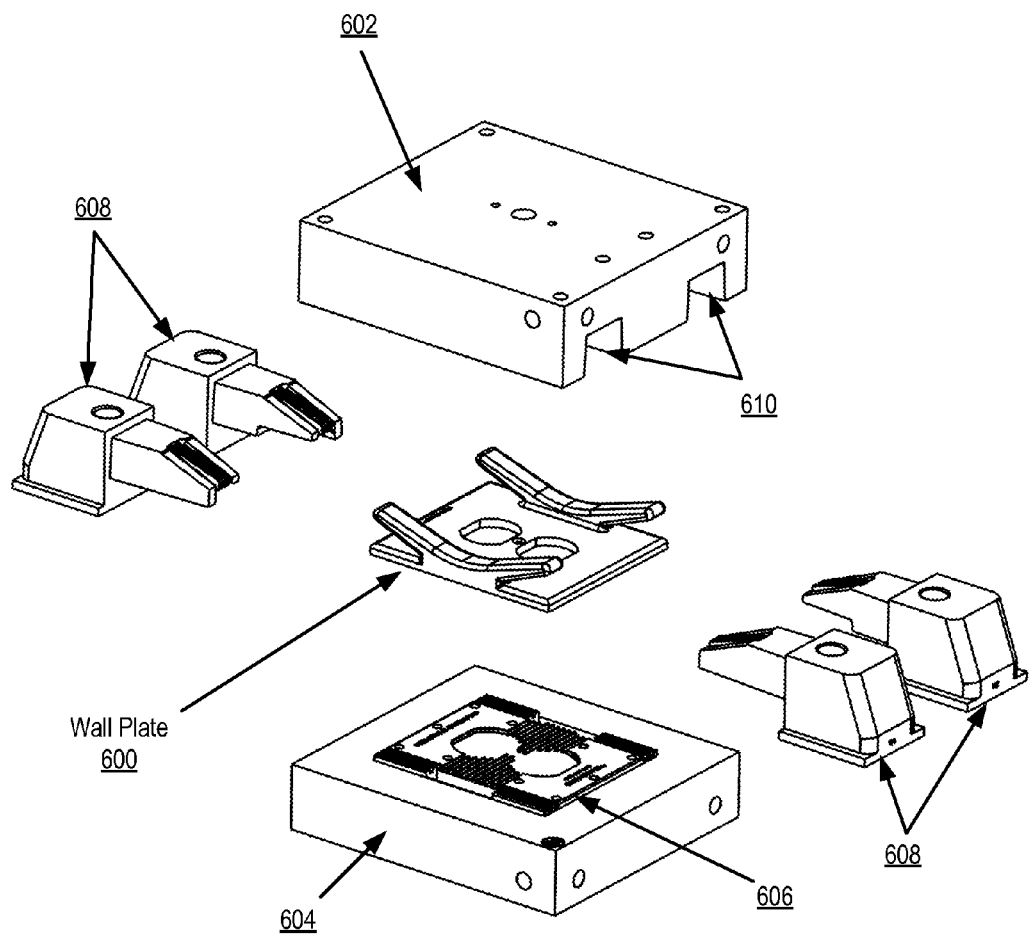
FIG. 6 includes an exploded isometric view of an example mold for use in manufacturing a wall plate configured for cable retention in accordance with embodiments of the present invention.

For further explanation, the example of FIG. 6 includes an exploded isometric view of an example mold for use in manufacturing a wall plate configured for cable retention in accordance with embodiments of the present invention. The example mold of FIG. 6 includes three portions: a top (602), a bottom (604), and slides (608). The top side is configured to be placed on the bottom side. The slides (608) are then configured to be inserted within the slide cavities (610). When all parts placed and installed, the mold forms a cavity (606). The cavity (606) is configured to receive liquid, injected material and has a shape defined by an electrical outlet wall plate (600) configured for cable retention. That is, the cavity defines the outer dimension of a wall plate that includes: a front and back side; one or more openings having a shape configured to receive an electrical outlet socket protrusion; one or more holes having a shape configured to receive a fastener, the fastener configured to fasten the wall plate to an electrical outlet; and one or more hybrid cleats extruding from the front side of the wall plate, with each hybrid cleat including two horns extending from the front side of the wall plate in opposite directions at an angle with respect to the front side of the wall plate so as to define a tapered space between the horn and the front side of the wall plate, the tapered space being the widest at the end of the horn and tapering to the narrowest where the horn contacts the front side of the wall plate, the tapered space configured to receive an electrical cable, the electrical cable being jammed in the tapered space between the horn and the front side of the wall plate.

In view of the explanations set forth above, readers will recognize that the benefits of wall plates configured for cable retention in accordance with embodiments of the present invention include:

- prevention of inadvertent unplugging of electrical cables;
- an integral wall plate for such cable retention, rather than multiple parts;
- single-handed operation to secure and release a cable;
- a relatively small amount of cable necessary for securing;
- natural structural strength of the hybrid cleat; and
- others as will occur to readers of skill in the art.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An electrical outlet wall plate configured for cable retention, the wall plate comprising:
   a front and back side;
   one or more openings having a shape configured to receive an electrical outlet socket protrusion;
   one or more holes having a shape configured to receive a fastener, the fastener configured to fasten the wall plate to an electrical outlet;
   one or more hybrid cleats projecting from the front side of the wall plate, each of said one or more hybrid cleats comprising two horns extending from the front side of the wall plate in opposite directions at an angle with respect to the front side of the wall plate so as to define a tapered space between one of the two horns and the front side of the wall plate, the tapered space being the widest at a top end of one of the two horns and tapering to the narrowest at a bottom end of one of the two horns, the tapered space configured to receive an electrical cable, the electrical cable being held in the tapered space between one of the two horns and the front side of the wall plate; and
   four edges defining a rectangular perimeter of the wall plate, wherein the two horns of the hybrid cleat are one of:
      parallel to a top edge and nearer to the top edge than the bottom edge;
      parallel to a bottom edge and nearer to the bottom edge than the top edge;
      parallel to a left edge and nearer to the left edge than the right edge; or
      parallel to a right edge and nearer to the right edge than the left edge.

2. The wall plate of claim 1 comprising a single piece of injection-molded plastic.

3. The wall plate of claim 1, wherein the back side of the wall plate further comprises one or more structural ridges configured to increase strength and rigidity of the wall plate.

4. The wall plate of claim 1, wherein the wall plate further comprises a multiple-gangbox width.

5. The wall plate of claim 1, further comprising a plurality of cleats positioned along and in parallel to one single edge.

6. The wall plate of claim 1, wherein:
   at least one of the openings has a shape configured to receive a ground fault circuit interrupter (GFCI) socket protrusion.

7. An injection mold comprising:
   a top, a bottom, and slides, wherein the top, the bottom, and the slides are placed and installed to form a cavity configured to receive liquid, injected material, the cavity having a shape defined by an electrical outlet wall plate configured for cable retention, the wall plate comprising: a front and back side;
   one or more openings having a shape configured to receive an electrical outlet socket protrusion; one or more holes having a shape configured to receive a fastener, the fastener configured to fasten the wall plate to an electrical outlet;
   one or more hybrid cleats projecting from the front side of the wall plate, each of said one or more hybrid cleats comprising two horns extending from the front side of the wall plate in opposite directions at an angle with respect to the front side of the wall plate so as to define a tapered space between one of the two horns and the front side of the wall plate, the tapered space being the widest at a top end of one of the two horns and tapering to the narrowest at a bottom end of one of the two horns, the tapered space configured to receive an electrical cable, the electrical cable being held in the tapered space between one of the two horns and the front side of the wall plate; and four edges defining a rectangular perimeter of the wall plate, wherein the two horns of the hybrid cleat are one of: parallel to a top edge and nearer to the top edge than the bottom edge; parallel to a bottom edge and nearer to the bottom edge than the top edge; parallel to a left edge and nearer to the left edge than the right edge; or parallel to a right edge and nearer to the right edge than the left edge.

8. The injection mold of claim 7, wherein the liquid injected material comprises a thermoplastic material.

9. The injection mold of claim 7, wherein the back side of the wall plate further comprises one or more structural ridges configured to increase strength and rigidity of the wall plate.

10. The injection mold of claim 7, wherein the wall plate further comprises a multiple-gangbox width.

11. The injection mold of claim 7, wherein the wall plate further comprises a plurality of cleats positioned along and in parallel to one single edge of the wall plate.

12. The injection mold of claim 7, wherein at least one of the openings has a shape configured to receive a ground fault circuit interrupter (GFCI) socket protrusion.

13. A method of manufacturing an electrical outlet wall plate configured for cable retention, the method comprising:
  receiving source material in a solid state;
  heating the source material into a liquid state; and
  injecting the liquid source material into a mold cavity, the mold cavity having a shape defined by an electrical outlet wall plate configured for cable retention, the wall plate comprising:
    a front and back side;
    one or more openings having a shape configured to receive an electrical outlet socket protrusion;
    one or more holes having a shape configured to receive a fastener, the fastener configured to fasten the wall plate to an electrical outlet;
    one or more hybrid cleats projecting from the front side of the wall plate, each of said one or more hybrid cleats comprising two horns extending from the front side of the wall plate in opposite directions at an angle with respect to the front side of the wall plate so as to define a tapered space between one of the two horns and the front side of the wall plate, the tapered space being the widest at a top end of one of the two horns and tapering to the narrowest at a bottom end of one of the two horns, the tapered space configured to receive an electrical cable, the electrical cable being held in the tapered space between one of the two horns and the front side of the wall plate; and
    four edges defining a rectangular perimeter of the wall plate, wherein the two horns of the hybrid cleat are one of:
      parallel to a top edge and nearer to the top edge than the bottom edge;
      parallel to a bottom edge and nearer to the bottom edge than the top edge;
      parallel to a left edge and nearer to the left edge than the right edge; or
      parallel to a right edge and nearer to the right edge than the left edge; and
  removing, from the mold after the liquid source material is cooled to a predefined temperature, the electrical outlet wall plate.

14. The method of claim 13, wherein the source material comprises a thermoplastic material.

15. The method of claim 13, wherein the back side of the wall plate further comprises one or more structural ridges configured to increase strength and rigidity of the wall plate.

16. The method of claim 13, wherein the wall plate further comprises a multiple-gangbox width.

17. The method of claim 13, wherein the wall plate further comprises a plurality of cleats positioned along and in parallel to one single edge of the wall plate.

18. The method of claim 13, wherein at least one of the openings has a shape configured to receive a ground fault circuit interrupter (GFCI) socket protrusion.

* * * * *